(12) United States Patent
Abraham et al.

(10) Patent No.: US 9,892,424 B2
(45) Date of Patent: Feb. 13, 2018

(54) COMMUNICATION WITH SHOPPERS IN A RETAIL ENVIRONMENT

(71) Applicant: International Business Machines Corporation, Armonk, NY (US)

(72) Inventors: Subil M. Abraham, Plano, TX (US); Rajaraman Hariharan, Karnataka (IN); Mathews Thomas, Flower Mound, TX (US); Priyadarshini Sampath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 13/959,177

(22) Filed: Aug. 5, 2013

(65) Prior Publication Data

US 2015/0039422 A1 Feb. 5, 2015

(51) Int. Cl.
*G06Q 30/00* (2012.01)
*G06Q 30/02* (2012.01)

(52) U.S. Cl.
CPC .............................. *G06Q 30/0251* (2013.01)

(58) Field of Classification Search
None
See application file for complete search history.

(56) References Cited

U.S. PATENT DOCUMENTS 6,144,944 A * 11/2000 Kurtzman, II ......... G06Q 30/02 705/1.1
8,321,303 B1 * 11/2012 Krishnamurthy ...... G06Q 30/02 705/28
8,326,690 B2 12/2012 Dicker et al.
9,516,470 B1 * 12/2016 Scofield ................ H04W 4/206
2006/0289637 A1 12/2006 Brice et al.
(Continued)

FOREIGN PATENT DOCUMENTS

WO WO 1998038589 * 9/1998 ............. G06F 17/60
WO WO 2011101613 A1 * 8/2011 ............... G01N 1/32

OTHER PUBLICATIONS

"Making retail smarter"; NFR 101st Annual Convention & Expo:; Jan. 15-18, 2012.
(Continued)

*Primary Examiner* — Matthew T Sittner
*Assistant Examiner* — Allan Woodworth, II
(74) *Attorney, Agent, or Firm* — Joseph W. Cruz

(57) ABSTRACT

Communication plans are created, modified, and executed by a campaign server. The campaign server creates a retail environment communication plan that specifies communications to be made to unidentified shoppers in a retail environment that includes at least one sensor. The campaign server identifies a shopper in the retail environment by the at least one sensor, and creates a shopper communication plan, based on the retail environment communication plan, that specifies communications to be made to the identified shopper in the retail environment. The campaign server executes the retail environment communication plan and the shopper communication plan. In response to processing an event sensed by the at least one sensor, the campaign server modifies one or both of the retail environment communication plan and the shopper communication plan.

2 Claims, 4 Drawing Sheets

(56) References Cited

U.S. PATENT DOCUMENTS

| | | | | |
|---|---|---|---|---|
| 2008/0004950 A1* | 1/2008 | Huang | .................... | G06Q 30/02 |
| | | | | 705/14.67 |
| 2009/0199107 A1* | 8/2009 | Lewis | ................ | G06Q 30/0241 |
| | | | | 715/745 |
| 2010/0332305 A1 | 12/2010 | Higgins et al. | | |
| 2012/0166241 A1* | 6/2012 | Livingston | ............. | G06Q 30/00 |
| | | | | 705/7.12 |
| 2014/0006152 A1* | 1/2014 | Wissner-Gross | .. | G06Q 30/0269 |
| | | | | 705/14.53 |
| 2014/0089112 A1* | 3/2014 | Argue | ................ | G06Q 20/3224 |
| | | | | 705/16 |

OTHER PUBLICATIONS

"NRF 2012: Experiential Shopping Demos—Department Store & Grocery—Demo Deployment Options"; IBM PowerPoint Presentation; pp. 1-2; Copyright 2012 IBM Corporation.

"Omni-channel commerce—IBM WebSphere Commerce for B2C and omni channel retailing"; IBM—Omni-channel commerce; Printed Aug. 2, 2013; <http://www-01.ibm.com/software/genservers/commerce/omni-channel-retailing/>.

"Omni-channel Retailing"; Wikipedia; Omni-channel Retailing—Wikipedia, the free encyclopedia; Printed Aug. 2, 2013; <http://en.wikipedia.org/wiki/Omni-channel_Retailing>.

\* cited by examiner

COMMUNICATION WITH SHOPPERS IN A RETAIL ENVIRONMENT

FIELD OF THE INVENTION

The present invention relates generally to shopper communications, and more particularly to communicating advertising, coupons, and other messages to shoppers in a retail environment.

BACKGROUND

Influencing shoppers in a retail environment can create instant results for retailers. As such, retailers typically use multiple channels to communicate with shoppers while they are within the retail environment, because this is an effective time and place to convince a shopper, i.e., a potential customer, to purchase a product and to help the shopper enjoy the shopping experience. The multiple channels used by the retailer can include an audio announcement system and an in-store television display, for example. Further, the number of channels that can be used to communicate with shoppers within a retail environment has been increasing, with the recent addition of technologies like smart phones, personal shopping assistants attached to shopping carts, fixed kiosks, and the like. Retailers can take the opportunity to send a communication to more than one of these channels to ensure that shoppers receive the communication. However, in many circumstances the information communicated to a shopper, which can include advertising, coupons, and other messages, may not be of interest to the shopper or may be irrelevant to the shopper. For example, the shopper may already have an advertised product in his or her shopping cart or shopping list.

SUMMARY

Embodiments of the present invention provide for a program product, system, and method for creating, modifying, and executing communication plans by a campaign server. The campaign server creates a retail environment communication plan that specifies communications to be made to unidentified shoppers in a retail environment that includes at least one sensor. The campaign server identifies a shopper in the retail environment by the at least one sensor, and creates a shopper communication plan, based on the retail environment communication plan, that specifies communications to be made to the identified shopper in the retail environment. The campaign server executes the retail environment communication plan and the shopper communication plan. In response to processing an event sensed by the at least one sensor, the campaign server modifies one or both of the retail environment communication plan and the shopper communication plan.

DETAILED DESCRIPTION

Figure 1:
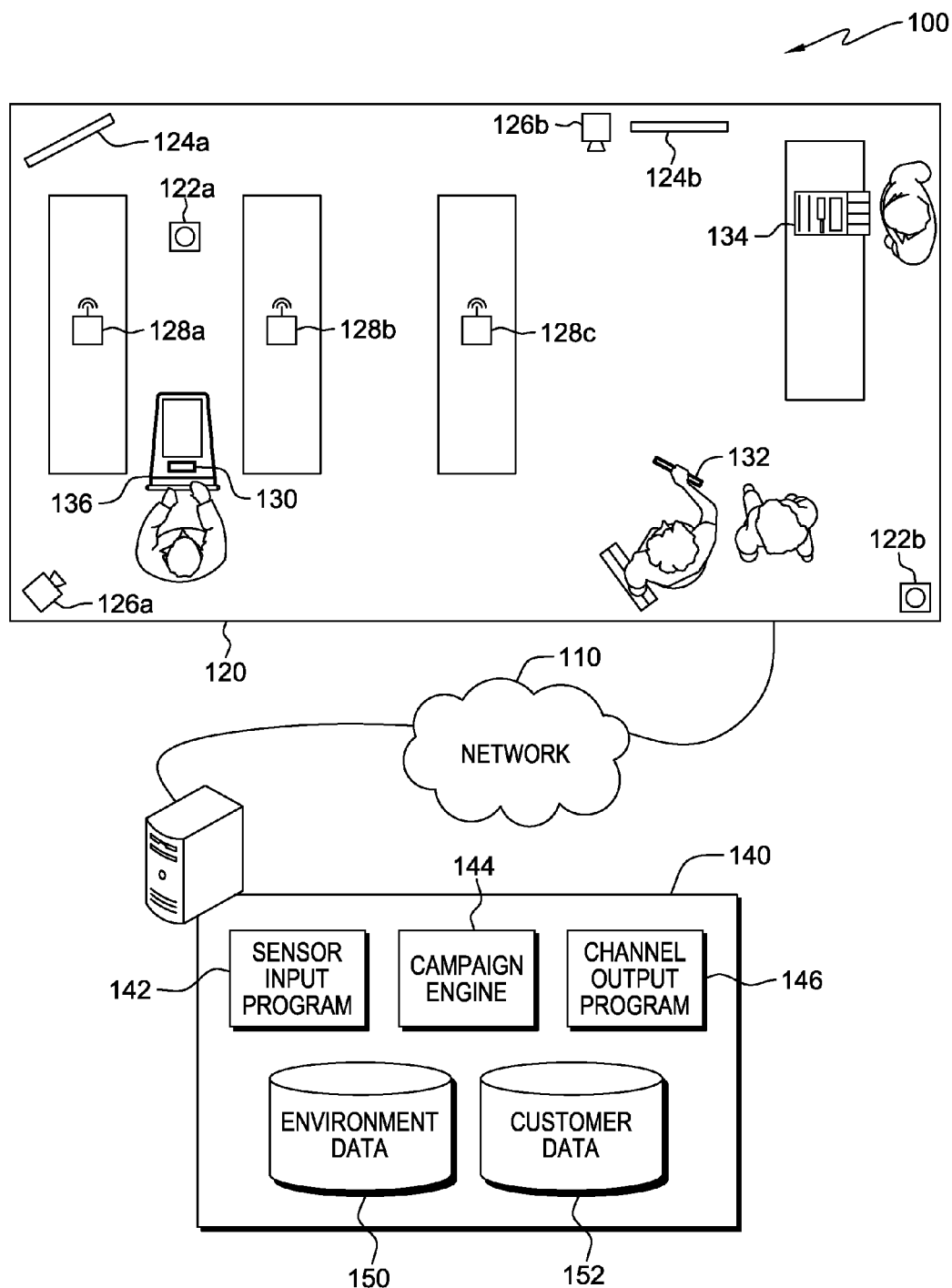
FIG. 1 is a functional block diagram of a communications environment in accordance with an embodiment of the present invention.

The techniques introduced herein address the planning and execution of communication plans for shoppers in a retail environment. Communication plans, which serve the ends of one or more enterprise campaigns, are dynamically developed and communicated through appropriate channels. Each enterprise campaign is a campaign to achieve some purpose in the retail environment, such as increased sales or increased shopper satisfaction, for example. A communication plan can be developed for each shopper or group of shoppers that enters the retail environment, and the plan is executed during the shopping trip of the shopper or shopper group. The communication plan is continuously updated during the shopping trip, based on significant events that affect the effectiveness of the communication plan. The communication plan can involve, direct, schedule, and specify the communication of advertisements, coupons, answers to questions that are asked when shoppers are in a given aisle, and recommendations to improve the shopping experience, such as directing shoppers to the correct checkout aisle, for example.

Factors to be considered for retail environment (i.e., default) communication plans can include advertisements or promotions about products in surplus inventory, advertisements or promotions about products with high profit margin, advertisements paid by vendor, general retail environment events, announcements about newly introduced products, seasonal or holiday products, specifications by retailer marketing teams (e.g., a marketing team might determine that product A should be communicated about just before product B, etc.).

Factors considered for initial shopper communication plans can include advertisements or promotions or general product information based on shopping history of a shopper, a wish list of the shopper, a previous purchase by a shopper, an up sell or cross sell of a product that was bought earlier, an offer about a product the shopper considered (e.g., handled in person, etc.) but did not buy, a common interest of the shopper's demographics on the current shopping trip, the historical information or shopper specified preference about frequency of in-store communication for each device or touch point used by the shopper, an association of each communication to a specific device or touch point based on characteristics of the content, historical success factors of communication, and location factors (e.g., advertise a grocery item when shopper is within twenty feet of product, or in the product's aisle, etc.).

The techniques introduced herein are achieved by gathering shopper location data, shopping cart information, customer loyalty data, shopper traffic patterns, and other data available within the retail environment which is analyzed and fed into a campaign server which distributes the appropriate communications to the shoppers using different channels.

Embodiments of the present invention create and modify a communication plan that includes the best content for communication, which channel to use for the communication, the sequence and timing of the communication, and so on. Upon a shopper's entry into the retail environment, a plan for the flow of communication is built considering various factors and dynamically modified. For example, if the shopper is picking items quickly, the campaign server may infer that the shopper is in a hurry and show a shorter version of a communication instead of longer version of the communication. Another example is to not show a selected advertisement to a shopper if the shopper's cart already has the advertised product or if the shopper has already seen the advertisement.

Embodiments of the present invention also send personalized content to the shopper using appropriate channels available in the retail environment. For example, shoppers may not appreciate seeing certain types of content on a large in-store display and the campaign server can instead send such content to a mobile device, such as a cell phone, of the shopper or to the audio announcement system, for example.

Embodiments of the present invention also customize communications displayed on in-store displays based on which shoppers can see each in-store display. If there is only one viewer, the display can be personalized for that specific viewer. If there are multiple viewers, an analysis is performed about these viewers and the advertisement most appropriate for the viewers, or for a selected one or more of the viewers, is displayed.

Embodiments of the present invention also personalize communications made via the in-store announcement system so that multiple speakers set up across the retail environment are used to send personalized information to the shoppers from appropriate speakers. Similar personalization can be done for other channels such as kiosks, and digital signage, for example.

Embodiments of the present invention also consider the trade off between shopper privacy and the appropriate amount of personalization. The campaign server mixes generic communications with personalized messages to the extent that the privacy of the shoppers is not compromised.

Embodiments of the present invention also provide the ability to upscale to a better channel for communication. When feasible, the campaign server may use a better mode of communication instead of the originally planned mode of communication. For example, if only one shopper is in a particular aisle from which an in-store display is visible, the communication relevant to that shopper can be displayed on that visible in-store display instead of the personal shopping assistant attached to the shopper's cart, if appropriate. This may be done because the in-store display has a better form factor and is expected to have a better influence on the shopper, for example.

Embodiments of the present invention also provide the ability to personalize content based on retail environment employee or sensor feedback. For example, sensors detect that an inventory of a product has run out of stock on a shelf in the retail environment. The campaign server is notified of this and stops promoting the product until inventory is replenished.

Embodiments of the present invention also provide an ability for a shopper to use a device (e.g., a smart phone, etc.) as a second channel to obtain additional information about a communication being broadcast via another retail environment display or audio channel. For example, a shopper in one aisle requests information shown on an in-store display via his or her cell phone. The campaign server determines the in-store display closest to the shopper, identifies the content in context and provides relevant information to the shopper via the second device. In an alternate scenario, the shopper can use the second device to directly add the advertised product to his or her shopping list, web shopping cart, or a wish list.

Embodiments of the present invention also synchronize the communications across the different channels. For example, if there is a high-value shopper in the retail environment, some or all of the communications channels in the vicinity of the high-value shopper can focus on him or her. Further, if the campaign server detects that a shopper is responding better to a given channel, then that channel will be used more for that shopper or for all shoppers.

If a planned communication is not fully executed before a shopper exit from the retail environment, then in various embodiments of the present invention the campaign server can determine if the rest of the communication (e.g., a subset or all of the remaining communication, etc.) should be sent through other channels to the shopper, and how the communications will continue when the shopper revisits the retail environment.

Although many of the above examples are given in the context of a retail environment, the techniques introduced herein are not limited to retail environments, and can be extended to other environments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a functional block diagram of communications environment 100 in accordance with an embodiment of the present invention is shown. Communications environment 100 includes network 110, speakers 122a and 122b, displays 124a and 124b, cameras 126a and 126b, RFID devices 128a, 128b, and 128c, personal shopping assistant 130, mobile device 132, point of sale device 134, and campaign server 140. At least a portion of communications environment 100 exists in or around retail environment 120. Retail environment 120 is shown to also include an employee at point of sale device 134, a shopper pushing shopping cart 136 to which personal shopping assistant 130 is attached, and a pair of shoppers entering retail environment 120, one of whom is carrying mobile device 132. It should be understood that retail environment 120 can include additional speakers, displays, cameras, RFID devices, personal shopping assistants, mobile devices, points of sale, other devices, carts, employees, and shoppers, beyond those depicted in FIG. 1. As discussed in detail below, in retail environment 120 shoppers can shop for and purchase products, while campaign engine 144 of campaign server 140 creates, modifies, and executes communication plans for the shoppers, in accordance with embodiments of the present invention.

Network 110 can be, for example, a local area network (LAN), a wide area network (WAN) such as the Internet, or a combination of the two, and can include wired or wireless connections. In general, network 110 can be any combination of connections and protocols that will support communications via various channels between speakers 122a and 122b, displays 124a and 124b, cameras 126a and 126b, RFID devices 128a, 128b, and 128c, personal shopping assistant 130, mobile device 132, point of sale device 134, and campaign server 140 in accordance with an embodiment of the invention. The various channels of network 110 can include a CCTV surveillance channel for cameras 126a and 126b, an audio distribution channel for speakers 122a and 122b, a wireless network for personal shopping assistant 130, and a cellular data network for mobile device 132, for example. Individual network connections between network 110 and the devices of communications environment 100 that exist in or around retail environment 120 are omitted from FIG. 1 for clarity.

In various embodiments, campaign server 140 can include a laptop, tablet, or netbook personal computer (PC), a desktop computer, a personal digital assistant (PDA), a smart phone, a mainframe computer, or a networked server computer. Further, campaign server 140 can include computing systems utilizing clustered computers and components to act as single pools of seamless resources when accessed through network 110, or can represent one or more cloud computing datacenters. In general, each of speakers 122a and 122b, displays 124a and 124b, cameras 126a and 126b, RFID devices 128a, 128b, and 128c, personal shopping assistant 130, mobile device 132, point of sale device 134, and campaign server 140 can be or can include any programmable electronic device as described in further detail with respect to FIG. 4.

Retail environment 120 can be any environment in which products are made available for sale to shoppers by an enterprise. The enterprise can be any enterprise involved in selling, or making available for sale, products of any type. For example, the enterprise can be a consumer retailer of products such as clothes, appliances, electronics, hardware, software, groceries, or any other goods. Generally, the products can include anything that has economic utility or satisfies an economic want, or anything grown, manufactured, or produced for sale. An employee of the enterprise assists shoppers with their purchases at point of sale device 134. However, in one embodiment, point of sale device 134 is a self-checkout device, such that shoppers do not need help with a purchase. In addition to purchasing, point of sale device 134 can also be configured as a sensing device that includes, e.g., an RFID device and a camera, and additionally configured as a communications channel that includes, e.g., a display and a speaker. Personal shopping assistant 130, attached to shopping cart 136, similarly can be configured as a sensing device that includes, e.g., an RFID device, a temperature sensor, and a camera, and additionally configured as a communications channel that includes, e.g., a display and a speaker.

The enterprise operating in retail environment 120 can control campaign server 140, of which campaign engine 144 creates, modifies, and executes communication plans for the shoppers. Communication plans, which serve the ends of one or more campaigns of the enterprise, are dynamically developed and communicated through appropriate channels by campaign engine 144. Each campaign is intended to achieve some purpose in retail environment 120, such as increased sales or increased shopper satisfaction, for example.

In one embodiment, two tiers of communication plans exist. For example, in a first tier a retail environment communication plan exists that includes a list of advertisements, offers, coupons, and other communications to be communicated in a given time period for retail environment 120 (this is effectively a default plan or generic plan for retail environment 120), while in a second tier a variety of shopper communication plans are generated by campaign engine 144 for each shopper or group of shoppers.

Campaign server 140 includes sensor input program 142, campaign engine 144, channel output program 146, environment data 150, and customer data 152. In one embodiment, campaign server 140 receives data from devices in or around retail environment 120, as well as from the enterprise operating in retail environment 120. The data can be stored in one or both of environment data 150 and customer data 152, and can be processed by campaign engine 144 to create and modify communication plans, which can also be stored in one or both of environment data 150 and customer data 152. Customer data 152 can further store enterprise loyalty account information for previous customers of the enterprise, where such information includes shopper preferences, discount program participation, purchase histories, etc. Based on the processing of the data, campaign engine 144 executes communication plans via channel output program 146.

Sensor input program 142 receives data from various devices in or around retail environment 120, including cameras 126a and 126b, RFID devices 128a, 128b, and 128c, personal shopping assistant 130, mobile device 132, point of sale device 134, and other devices in or around retail environment 120 that have a sensing capability. Additionally, sensor input program 142 performs analysis on the received data to determine or infer additional analysis data. Sensor input program 142 provides some or all of the received data and the analysis data to campaign engine 144, either directly or via one or both of environment data 150 and customer data 152.

For example, sensor input program 142 can analyze video data from cameras 126a and 126b to determine analysis data in the form of an identification of a related group of shoppers (e.g., sensor input program 142 can identify the pair of shoppers entering retail environment 120, one of whom is carrying mobile device 132, as related family members, etc.), and provide this analysis data directly to campaign engine 144, and can also provide dynamic inventory data from RFID devices 128a, 128b, and 128c for storage in environment data 150. Further, sensor input program 142 can pinpoint the location of mobile device 132 with high accuracy, either with the cooperation of a cellular data network carrier of mobile device 132, provided that the shopper who owns mobile device 132 consents, or without the cooperation of the cellular data network carrier of mobile device 132, provided that an application installed on mobile device 132 gives sensor input program 142 access to a location sensor of mobile device 132. Further still, sensor input program 142 can determine the location and product contents of cart 136 based on RFID devices or other sensors of personal shopping assistant 130. Additional capabilities of sensor input program 142 are discussed below, in the context of operations of campaign engine 144.

Channel output program 146 transmits communications and other data to various devices in or around retail environment 120, including speakers 122a and 122b, displays 124a and 124b, personal shopping assistant 130, mobile device 132, point of sale device 134, and other devices in or around retail environment 120 that have a communication channel capability. Notably, some devices have both a sensing and a communication channel capability (e.g., personal shopping assistant 130, etc.). Channel output program 146 transmits data at the direction of campaign engine 144, during execution by campaign engine 144 of a communication plan. For example, channel output program 146 can display an advertisement on display 124b. Additional capabilities of channel output program 146 are discussed below, in the context of operations of campaign engine 144.

Campaign engine 144 can prepare a retail environment communication plan in advance of a given period of time (e.g., one full day of operations in retail environment 120, etc.) and execute the retail environment communication plan when retail environment 120 opens. As the period of time progresses, campaign engine 144 processes events such as shopper entry, shopper exit, the number of shoppers in each aisle or area, the number of shoppers near a display or speaker, retail events like shortages of inventory, or stock outages at a shelf. Based on the events, campaign engine 144 updates the retail environment communication plan and shopper communication plans appropriately.

Campaign engine 144 can communicate to shoppers in retail environment 120 in a number of ways. For example, campaign engine 144 can send personalized content to a shopper based on known preferences of the shopper stored in customer data 152, the location of the shopper (e.g., if the shopper is close to a product, campaign engine 144 can advertise the product to the shopper but stop the advertisement when the shopper is about to checkout, etc.) and the product contents of cart 136 (e.g., campaign engine 144 can cross sell or up sell based on the product contents, or refrain from advertising a product if the product is already in cart 136, etc.). The communicated content may be informational, product advertisement, promotional offers, and the like.

Campaign engine 144 can identify shopper groups using several techniques. For example, campaign engine 144 can use information about family members of a primary shopper and information about devices (e.g., mobile device 132, etc.) owned by the group that are captured in the loyalty system in customer data 152. Association between the group member and the device owned by that member can also be tracked in the loyalty system. When a shopper enters retail environment 120 and starts using personal shopping assistant 130, he or she is automatically identified when he or she logs into personal shopping assistant 130 (by, e.g., swiping a customer loyalty card in a card reader of personal shopping assistant 130, etc.). Campaign engine 144 can also determine the location of all the devices owned by the group and identify those devices that are in or around retail environment 120. Based on the identified devices, campaign engine 144 infers which members of the group are present. In another embodiment, each member of the shopping group may log into a enterprise-provided mobile application upon entrance to retail environment 120. Accordingly, the shoppers of the group who are present are identified with high accuracy. As the loyalty information is identified to personal shopping assistant 130, the set of shoppers who have logged into the mobile application can be automatically associated to the group represented at personal shopping assistant 130. Further, in another embodiment, a group of shoppers may be manually identified by an employee at point of sale device 134, for example.

When multiple groups are in or around retail environment 120, each shopper group or an individual shopper can have a set of identifying characteristics that is used by campaign engine 144 to determine the type of information to be or not to be communicated to that group or shopper. When multiple distinct shopper groups or individual shoppers are present in a particular area of retail environment 120, campaign engine 144 will apply any of the standard data clustering techniques across the list of identifying characteristics to identify common characteristics across the shoppers in the area. The common characteristics identified by the clustering method will be used by campaign engine 144 to identify the type of information to be or not to be communicated. For example, campaign engine 144 may determine that the set of shoppers in the area have fashion as a common interest and may try to communicate fashion related content on displays 124a and 124b, for example. In another example, campaign engine 144 may determine that the set of shoppers in the area includes shoppers below a certain age and may place a ban on certain type of content that is not appropriate.

Campaign engine 144 can create, modify, and execute a personalized communication plan for each shopper (or related group of shoppers), which considers the available channels for communicating to the shopper (or related group of shoppers) and the collective set of shoppers currently in the store. The communication plan can include the best content for communication, which channel to use for the communication, and the sequence and timing of the communication, in one embodiment. The communication plan identifies the content to be communicated with the channel to be used in the communication. Some devices are exclusive to one shopper or group (e.g., mobile device 132 and personal shopping assistant 130, etc.), while others may be shared between multiple shoppers or groups (e.g., speakers 122a and 122b and displays 124a and 124b, etc.).

Campaign engine 144 can consider a device's exclusivity and effectiveness to arrive at an effective communication plan. For example, in one embodiment campaign engine 144 classifies the available devices as enterprise-owned public devices (e.g., speakers and large, highly-visible displays, etc.), enterprise-owned group or personal devices (e.g., a personal shopping assistant shared by a shopper group or exclusive to an single shopper, etc.), and shopper-owned personal devices (e.g., mobile device 132, etc.). Campaign engine 144 can use this classification to determine the usage (e.g., the time slicing, etc.) of each device for a shopper or a group of shoppers. Further, campaign engine 144 can determine the best channel to reach a shopper, based on a shopper attitude toward propriety or social mores. In particular, certain shoppers may not appreciate seeing certain types of controversial or sensitive content on displays 124a and 124b, and may instead prefer to see such content on mobile device 132, or not at all.

Upon a shopper's entry into retail environment 120, campaign engine 144 can create a communication plan for the flow of communication that is statically built, by considering the available set of devices. Campaign engine 144 can determine the content for communication from many sources, such as the shopper's historical buying pattern, the shopper's communication preferences (e.g., what content is allowed to be advertised, the frequency and level of personalization, the shopper's preferred language, etc.), or products searched by the shopper in an internet store of the enterprise, for example, as all recorded in customer data 152. The content for communication can also be determined from, for example, products complimentary to products in cart 136, as recorded in environment data 150, or as reported to sensor input program 142 by personal shopping assistant 130. Campaign engine 144 can exclude from the communication plan content that was shown to the shopper in a previous shopping trip. The shopper's usual shopping traversal path in the store, as previously recorded by cameras 126a and 126b by sensor input program 142 into environment data 150 or customer data 152 can also be considered by campaign engine 144 in determining the sequence and timing of the communication plan.

Campaign engine 144 can perform dynamic sequencing of communication. In particular, campaign engine 144 can dynamically update the communication plans of shoppers in retail environment 120 based on opportunities to improve the communication effectiveness or other events that necessitate modifications to the existing communication plans. The sequence of content to be communicated may be changed dynamically, for example, when the shopper deviates from an expected shopping traversal path, when the shopper's apparent mood or speed changes, when a number of shoppers near an aisle are detected by cameras 126a and 126b, or when products are detected in cart 136. The apparent mood of a shopper can be considered to be changed by campaign engine 144 if the shopper suddenly starts selecting products quickly, or starts returning products from cart 136 to the shelf, or joins or exits a group of shoppers, for example. Further, campaign engine 144 can determine that a high-value shopper has entered retail environment 120 and thus that the overall communication plans need to be adjusted to achieve maximum effectiveness at a broader level. Further still, campaign engine 144 can alter the communication plan by adding a product informational advertisement if a shopper is in the specific product area but had not yet added the product to cart 136, offer to add to a wish list if the shopper analyzed a product that was advertised but did not add it to cart 136, etc. Further still, campaign engine 144 can halt or pause the communication plan if the shopper is checking out at point of sale 134, or having a phone conversation on mobile device 132, for example.

Campaign engine 144 can use the shopping climate of a shopper or a group of shoppers to determine how communications are performed. For example, the communications displayed on displays 124a and 124b can be customized based on which shoppers each display is visible to. If there is only one shopper who can see a given display, the display can be personalized for that specific shopper. If there are multiple shoppers who can see a given display, sensor input program 142 can perform an analysis to determine the advertisement most appropriate for the viewers. The analysis is done by using location information about the shoppers, image analysis techniques that can give characteristics about the shoppers (e.g., distinguish families from separate individuals, etc.), shopping basket analysis, and route analysis within retail environment 120, for example. Campaign engine 144 analyzes this information to determine what content to display for the sum total of shoppers each display is visible to. Similarly, the communications communicated via speakers 122a and 122b can be customized based on which shoppers are within hearing distance. Further, if a shopper is picking products quickly, campaign engine 144 can infer that the shopper is in a hurry and show the shopper shorter versions of advertisements in a communication plan instead of longer versions.

Campaign engine 144 can optimize the display of communications based on considerations of privacy and personalization. While providing the most well-suited advertisements based on the aggregate of shoppers in retail environment 120, campaign engine 144 can mix generic advertisements with personalized advertisements to the extent that the privacy of the shoppers is not compromised. This ensures that a shopper gets personalized advertisements, while preventing other shoppers in retail environment 120 from identifying an individual shopper's needs or preferences just by overseeing or overhearing the displayed advertisements. Campaign engine 144 can aggregate the wish lists, shopper preferences, discount program participation, purchase histories, and other data of shoppers in retail environment 120, in one or both of environment data 150 and customer data 152, to determine the most appropriate communication content for the shoppers. Depending on the number of shoppers in retail environment 120, campaign engine 144 can vary the ratio of generic to personalized content. For example, if there is only one shopper in retail environment 120, all of the content can be personalized. If there are only one or two shoppers, campaign engine 144 can maintain a personalized advertisement to generic advertisement ratio to 5:1, while if there are more than ten shoppers, campaign engine 144 can maintain the ratio at 3:1, for example.

Campaign engine 144 can upscale to a better channel for communication. In particular, when feasible, campaign engine 144 can use a better medium of communication instead of an originally planned medium of communication. For example, if only one shopper is in a particular aisle from which display 124a is visible (i.e., the shopper pushing cart 136), then a communication personalized to that shopper can be displayed on display 124a instead of a display of personal shopping assistant 130. This may be done because display 124a has a better form factor than a display of personal shopping assistant 130, and because display 124a may have a better influence on the shopper. For another example, if a communication plan calls for an advertisement to be shown to the pair of shoppers entering retail environment 120 on display 124b, and then campaign engine 144 determines that one of the pair is carrying mobile device 132 which is configured to display advertisements, then campaign engine 144 can upscale from display 124b to mobile device 132. As such, upscaling can entail changing from small to large displays, from large to small displays, from far to near displays, and from near to far displays, depending on the balance of factors as judged by campaign engine 144. Further, upscaling can similarly entail changing from small to large speakers, from large to small speakers, from far to near speakers, and from near to far speakers. Further still, upscaling can entail changing from audio to video channels and from video to audio channels.

Campaign engine 144 can personalize content based on store employee or customer feedback, such as feedback provided by the employee at point of sale device 134. For example, the employee at point of sale device 134 can communicate to campaign engine 144 via an interface of point of sale device 134 that many shoppers are asking about the location of a product. Responsively, campaign engine 144 can play an informational video or audio segment about the location in retail environment 120 where shoppers can find the product, on displays 124a and 124b and speakers 122a and 122b, respectively. Further, if many shoppers are asking about the difference between two products, campaign engine 144 can play a product-related informational video or audio segment. Shoppers can ask about product differences by asking an employee, or by asking personal shopping assistant 130, for example. The product-related informational video or audio segment can be played on all channels in retail environment 120 (e.g., if the employee at point of sale device 134 has been asked, etc.), or played only in the aisle in which the product is displayed (e.g., if personal shopping assistant 130 has been asked, then the product-related informational video or audio segment can be played on display 124a and speaker 122a, respectively, etc.). Further still, if an employee learns that the inventory of an item being promoted has run out of stock on the store shelf, then before going to refill the shelf the employee can request that campaign engine 144 not promote the product until the refill is completed.

Campaign engine 144 can allow a shopper to use a device, such as mobile device 132, as an additional display to obtain additional information about a communication being broadcast via displays 124a and 124b, speakers 122a and 122b, or personal shopping assistant 130, for example. This includes capability to use location information of the shopper to determine the broadcasting device and its content, so as to be able to present the correct additional information on mobile device 132. For example, a shopper entering retail environment 120 with mobile device 132 can request additional information via mobile device 132 upon viewing a communication from campaign engine 144 on display 124b. Campaign engine 144 determines that display 124b is the only display that the shopper entering retail environment 120 can see, or determines that display 124b is the most probable display that the shopper entering retail environment 120 is interested in, and provides relevant additional information to the shopper via mobile device 132. Further, the shopper can use an application on mobile device 132 to add an advertised product in the communication to his or her web shopping cart or wish list.

Campaign engine 144 can select the communication device during execution of a communication plan, while the channel has been pre-determined by the communication plan. For example, if the communication plan is to show an offer for a product using any one or more of displays 124a and 124b, then campaign engine 144 can select the most appropriate display for this communication at execution time based on the location of the shoppers in retail environment 120. Further, campaign engine 144 can select the timing of when an advertisement is played on speakers 122a and 122b based on when shoppers are at the best listening distance from the speakers. If campaign engine 144 identifies a conflict between two or more communications to be displayed to multiple shoppers on a common display, then campaign engine 144 can resolve the conflict to determine the more suitable choice of communication based on, for example, which communication will appeal to the higher-value shopper.

Campaign engine 144 can extend a communication plan when all of the content from the communication plan has been communicated to the shoppers. For example, campaign engine 144 may select new or previously communicated content as part of an extended communication plan. Similarly, if a shopper exits retail environment 120 before all of the planned content of the communication plan has been communicated, then campaign engine 144 can retain the remaining communications for a subsequent visit, can discard the remaining communications, or can send an offline communication related to the remaining communications to the shopper, for example.

Figure 2:
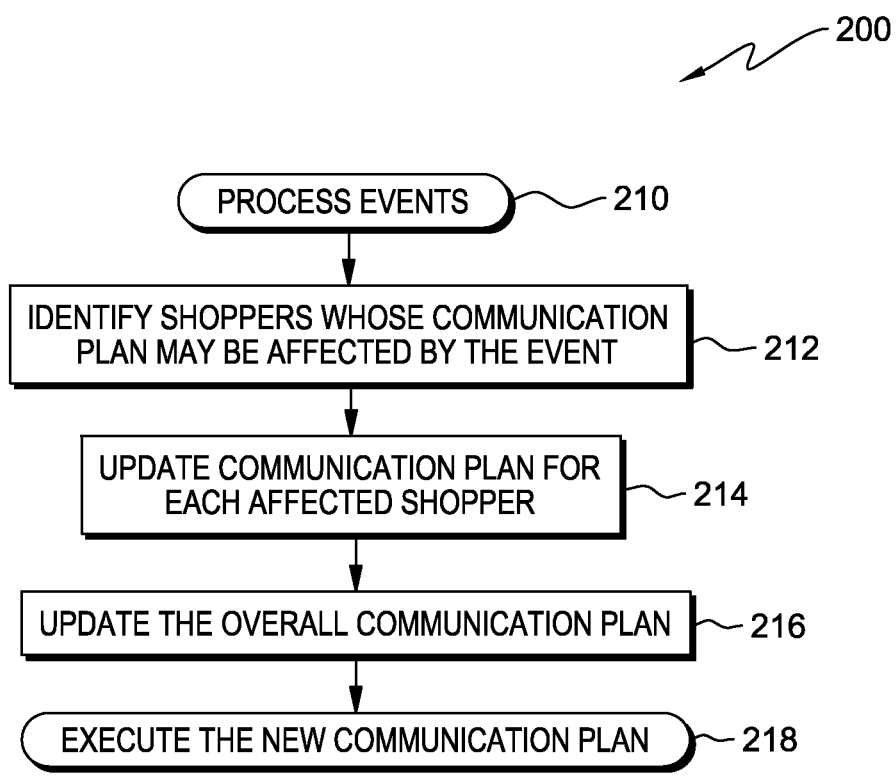
FIG. 2 shows a flowchart depicting steps followed during the creation, modification, and execution of communication plans in accordance with an embodiment of the present invention.

Referring now to FIG. 2, flowchart 200 depicting steps followed during the creation, modification, and execution of communication plans in accordance with an embodiment of the present invention is shown. In step 210, events are processed by campaign engine 144. For example, campaign engine 144 can process events based on data captured by sensor input program 142. In step 212, campaign engine 144 identifies shoppers in retail environment 120 whose communication plan may be affected by the processed events. For example, campaign engine 144 can identify a shopper who has started to shop more quickly as one whose communication plan may be affected. In step 214, campaign engine 144 updates the communication plan for each affected shopper. For example, the communication plan of the shopper who is shopping more quickly can be updated to include advertisements of shorter duration. In step 216, campaign engine 144 updates the overall retail environment communication plan for retail environment 120. For example, given that the shopper who is shopping more quickly is being shown advertisements of shorter duration, the retail environment communication plan can be changed to show advertising of longer duration to the other shoppers, in order to fill up the freed time. In step 218, campaign engine 144 executes the new shopper and retail environment communication plan.

Figure 3:
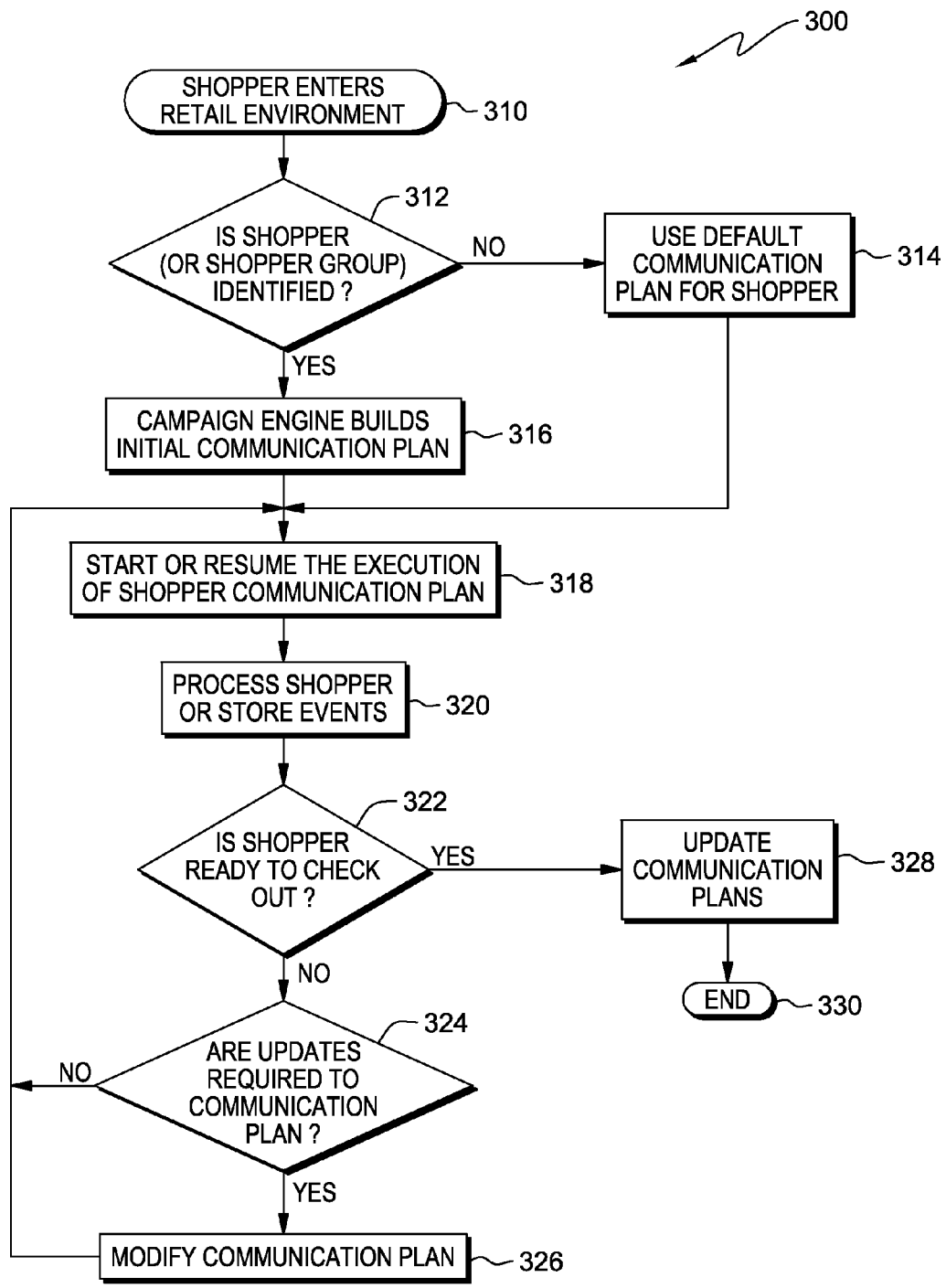
FIG. 3 shows a flowchart depicting steps followed during the creation, modification, and execution of communication plans in accordance with an embodiment of the present invention.

Referring now to FIG. 3, flowchart 300 depicting steps followed during the creation, modification, and execution of communication plans in accordance with an embodiment of the present invention is shown. In step 310, a shopper (or shopper group) enters retail environment 120. For example, a pair of shoppers enters retail environment 120, one of whom is carrying mobile device 132. In step 312, campaign engine 144 attempts to identify the shopper or shopper group. If campaign engine 144 cannot make the identification, then in step 314 campaign engine 144 uses a retail environment (i.e., default) communication plan to communicate with the unidentified shopper or shopper group. However, if campaign engine 144 can identify the shopper or shopper group (e.g., identifies the pair of shoppers entering retail environment 120 as a family group, etc.), then in step 316 campaign engine 144 builds an initial communication plan for the shopper or shopper group.

In step 318, campaign engine 144 starts the execution of the (default or initial) communication plan. In step 320, campaign engine 144 processes shopper or store events (e.g., events as contemplated by step 210 in FIG. 2, etc.). In step 322, campaign engine 144 determines whether the shopper or shopper group is ready to check out. If so, then in step 328, campaign engine 144 updates the default and initial communication plans based on the events generated during the shopper or shopper group's visit to retail environment 120, and in step 330 campaign engine 144 halts or pauses the communication plan specific to the shopper or shopper group. If not, then in step 324 campaign engine 144 determines if updates are required to the communication plan. For example, updates may be required as contemplated in step 214 and step 216 in FIG. 2. If not, campaign engine 144 returns to execution in step 318. However, if so, then campaign engine 144 modifies the communication plan in step 326.

Figure 4:
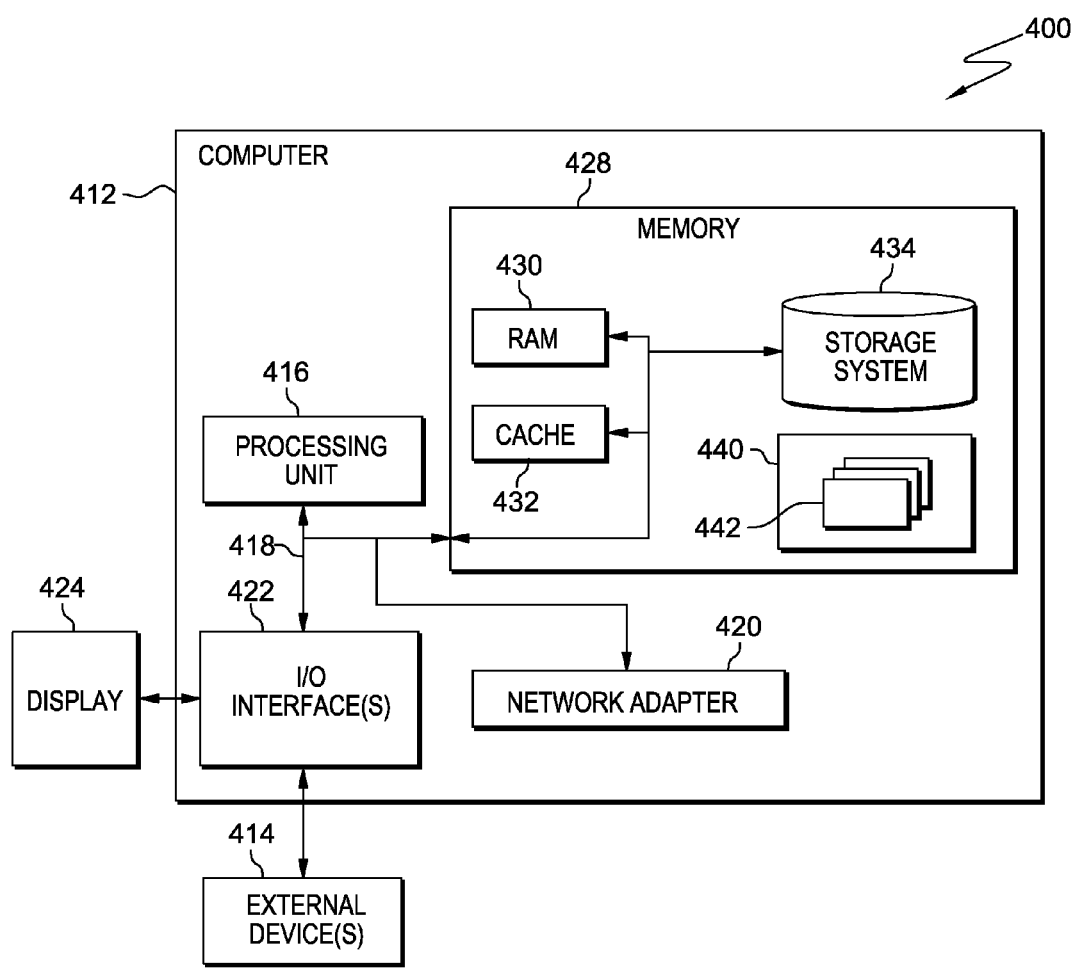
FIG. 4 is a functional block diagram of a computer system in accordance with an embodiment of the present invention.

Referring now to FIG. 4, a functional block diagram of a computer system in accordance with an embodiment of the present invention is shown. Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove.

In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each of speakers 122a and 122b, displays 124a and 124b, cameras 126a and 126b, RFID devices 128a, 128b, and 128c, personal shopping assistant 130, mobile device 132, point of sale device 134, and campaign server 140 can include or can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 in computer system 400 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 can include computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program 440, having one or more program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Each one of sensor input program 142, campaign engine 144, and channel output program 146 can be implemented as or can be an instance of program 440.

Computer 412 may also communicate with one or more external devices 414 such as a keyboard, a pointing device, etc., as well as display 424; one or more devices that enable a user to interact with computer 412; and/or any devices (e.g., network card, modem, etc.) that enable computer 412 to communicate with one or more other computing devices. Such communication can occur via Input/Output (I/O) interfaces 422. Still yet, computer 412 can communicate with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating, modifying, and executing a communication plan within a campaign server, the campaign server includes a pool of clustered computers that correspond to one or more cloud computing data centers, at least one of the clustered computers being a mainframe computer, the campaign server being wirelessly connected, via one or more networks, to a plurality of devices within a retail environment, the plurality of devices including: one or more display devices, one or more speakers, one or more RFID devices, one or more cameras, one or more personal shopping assistants fastened to one or more corresponding shopping carts, and one or more point of sale devices, the method comprising the steps of:

creating, a default retail environment communication plan that specifies communications to be made to unidentified shoppers in the retail environment that includes at least one sensor, the default retail environment communication plan being based at least on analyzing a first set of inventory data received from the one or more RFID devices, the first set of inventory data corresponding to a quantity of retail items that are currently available for purchase;

identifying, via analyzing video data from a first camera of the one or more cameras, a shopper in the retail environment;

modifying the default retail environment communication plan for the identified shopper, the shopper communication plan specifies communications to be made to the identified shopper in the retail environment based on: a shopping history of the identified shopper, a shopping list of the identified shopper, a previous purchase by the identified shopper, an up sell or cross sell of a first product that was bought earlier by the identified shopper, an offer about a second product the identified shopper considered but did not buy, the identified shopper's demographics on a current shopping trip, the identified shopper's specified preference about frequency of in store communication for each device or touch point used by the identified shopper, determining that the identified shopper is near a first device of the plurality of devices, and an association of each communication to a specific device based on characteristics of a content, historical success factors of communication, and location factors;

executing the shopper communication plan;

processing one or more events sensed at least by: a camera of the one or more cameras, a point of sale device of the one or more point of sale devices, and the one or more RFID devices;

dynamically modifying the shopper communication plan in response to one or more events by at least:

upscaling from one or more channels associated with a first shopping assistant of the one or more personal shopping assistants to one or more channels associated with a first display device of the one or more display devices, wherein the upscaling causes data associated with the shopper communication plan to be displayed on the first display device instead of the first shopping assistant, wherein the first display is a more suitable mode of communication to the identified shopper than the first shopping assistant;

receiving feedback at the one or more point of sale devices that a plurality of shoppers in the retail environment have inquired about a location of a third product, and in response to the receiving of the feedback, causing a second display device of the one or more display devices to display to an informational video about the location in the retail environment where the plurality of shoppers can find the third product, determining, via data clustering techniques, that the plurality of shoppers have a common interest, and causing a third display device of the plurality of devices to display the content based on the common interest, determining, via a second camera of the one or more cameras, that the identified shopper has placed a first item in a shopping cart, and in response to the determining that the identified shopper has placed a first item in the shopping cart, refraining from transmitting advertisements about the first item to the identified shopper, and receiving a second set of inventory data received from the one or more RFID devices, the second set of inventory data indicating a change in the first set of inventory data, wherein the change corresponds to a stock outage of a second item of the retail items at a particular shelf, and wherein the second item is not currently available for purchase.

2. A computer program product for creating, modifying, and executing a communication plan within a campaign server, the campaign server includes a pool of clustered computers that correspond to one or more cloud computing data centers, at least one of the clustered computers being a mainframe computer, the campaign server being wirelessly connected, via one or more networks, to a plurality of devices within a retail environment, the plurality of devices including: one or more display devices, one or more speakers, one or more RFID devices, one or more cameras, one or more personal shopping assistants fastened to one or more corresponding shopping carts, and one or more point of sale devices, the computer program product comprising:

one or more non-transitory computer-readable tangible storage devices and program instructions stored on at least one of the one or more storage devices, the program instructions comprising:

program instructions to create a default retail environment communication plan that specifies communications to be made to unidentified shoppers in the retail environment that includes at least one sensor, the default retail environment communication plan being based at least on analyzing a first set of inventory data received from the one or more RFID devices, the first set of inventory data corresponding to a quantity of retail items that are currently available for purchase;

program instructions to identify, via analyzing video data from a first camera of the one or more cameras, a shopper in the retail environment;

program instructions to create a shopper communication plan that modifies the default retail environment communication plan for the identified shopper, the shopper communication plan specifies communications to be made to the identified shopper in the retail environment based on: a shopping history of the identified shopper, a shopping list of the identified shopper, a previous purchase by the identified shopper, an up sell or cross sell of a first product that was bought earlier by the identified shopper, an offer about a second product the identified shopper considered but did not buy, the identified shopper's demographics on a current shopping trip, the identified shopper's specified preference about frequency of in- store communication for each device or touch point used by the identified shopper, determining that the identified shopper is near a first device of the plurality of devices, and an association of each communication to a specific device based on characteristics of a content, historical success factors of communication, and location factors;

program instructions to execute the shopper communication plan;

program instructions to process one or more events sensed at least by: a camera of the one or more cameras, a point of sale device of the one or more point of sale devices, and the one or more RFID devices in the retail environment; and program instructions to dynamically modify the shopper communication plan in response to the one or more events by at least:

upscaling from one or more channels associated with a first shopping assistant of the one or more personal shopping assistants to one or more channels associated with a first display device of the one or more display devices, wherein the upscaling causes data associated with the shopper communication plan to be displayed on the first display device instead of the first shopping assistant, wherein the first display is a more suitable mode of communication to the identified shopper than the first shopping assistant, receiving feedback at the one or more point of sale devices that a plurality of shoppers in the retail environment have inquired about a location of a third product, and in response to the receiving of the feedback, causing a second display device of the one or more display devices to display to an informational video about the location in the retail environment where the plurality of shoppers can find the third product, determining, via data clustering techniques, that the plurality of shoppers have a common interest, and causing a third display device of the plurality of devices to display the content based on the common interest, determining, via a second camera of the one or more cameras, that the identified shopper has placed a first item in a shopping cart, and in response to the determining that the identified shopper has placed a first item in the shopping cart, refraining from transmitting advertisements about the first item to the identified shopper, and receiving a second set of inventory data received from the one or more RFID devices, the second set of inventory data indicating a change in the first set of inventory data, wherein the change corresponds to a stock outage of a second item of the retail items at a particular shelf, and wherein the second item is not currently available for purchase.

\* \* \* \* \*